United States Patent [19]

Naruto et al.

[11] Patent Number: 4,622,456

[45] Date of Patent: Nov. 11, 1986

[54] AFTER HOUR DEPOSITORY

[75] Inventors: Eiro Naruto; Hiroshi Masachika, both of Hiroshima, Japan

[73] Assignee: Kumahira Safe Co. Inc., Hiroshima, Japan

[21] Appl. No.: 610,808

[22] Filed: May 16, 1984

[30] Foreign Application Priority Data

Feb. 8, 1984 [JP] Japan ............ 59-21304

[51] Int. Cl.[4] ............ G06F 15/30

[52] U.S. Cl. ............ 235/379; 109/66

[58] Field of Search ............ 235/379; 109/66

[56] References Cited

U.S. PATENT DOCUMENTS 4,176,610 12/1979 Markham et al. ............ 109/66 X 4,510,381 4/1985 Fukatsu ............ 235/379

*Primary Examiner*—David L. Trafton

*Attorney, Agent; or Firm*—Cushman, Darby & Cushman

[57] ABSTRACT

An improved after hour depository of the type including a throw-in door turnably housed in the frame is disclosed. A control panel is disposed on the frame at the position located adjacent to the throw-in door to control turning movement of the throw-in door. A magnetic card is previously allocated to a client by the bank and when he visits there, he inserts his magnetic card into a card insert slit on the control panel. A control circuit having a number of informations concerning all clients stored therein is electrically connected to the control panel. A locking and unlocking apparatus is provided between the frame and the throw-in door to lock or unlock the throw-in door in accordance with command issued from the control circuit. The locking and unlocking apparatus comprises an electromagnetic solenoid, a locking hole formed on the one side plate of the throw-in door and an actuating mechanism adapted to allow a locking bar to come in or out of the locking hole in response to signal transmitted from the control circuit. The actuating mechanism is operatively connected to the electromagnetic solenoid by way of a linkage system. A spring means adapted to allow the locking bar to normally come out of the locking hole is included in the actuating mechanism. When electric power supply is interrupted, the depository is handled by actuating his key in the conventional manner.

6 Claims, 20 Drawing Figures

AFTER HOUR DEPOSITORY

BACKGROUND OF THE INVENTION

1. Field of the Invention

The present invention relates to an after hour depository and more particularly to improvement of or relating to an after hour depository of the type including a throw-in door turnably housed in a frame fitted into an opening on a building such as a bank the throw-in door includes a combination of fragmental cylinder member and movable wall and operates in such a manner that when a client uses an envelope for depositing an item, it assumes a first position where a V-shaped pocket as defined by the partition wall and the movable wall is half opened and when a cash bag is used for depositing, it assumes the second position where the pocket is fully opened.

2. Description of the Prior Art

An after hour depository of the above-mentioned type is already known. However, the conventional after hour depository is constructed such that only little information such as date and time of money deposition and number of cash bags used are printed as records for client services. As data processing techniques have improved year by year, requests for supplying more information to clients have been raised from both users and bankers.

SUMMARY OF THE INVENTION

The present invention has been made with the foregoing background in mind.

It is an object of the invention to provide an improved after hour depository which can provide more information to each client visits the bank. The information includes date and time of money deposition, number of cash bags used, client name, bank name and others, while using a magnetic card allocated to each client by the bank.

It is another object of the invention to provide an improved after hour depository which assures that a client is identified without fail by comparison between new information and information stored in the control circuit with a main computer incorporated therein.

It is another object of the invention to provide an improved after hour depository which can be handled by actuating a key in the conventional manner when the electric power supply is interrupted for any reason.

To accomplish the above objects there is proposed in accordance with the invention an improved after hour depository of the earlier mentioned type which further includes a control panel mounted on the frame to control turning movement of the throw-in door, a control circuit electrically connected to the control panel and data memory which can store a number of information items concerning each client stored therein, and a locking and unlocking apparatus disposed between the frame and the throw-in door to lock or unlock the latter in accordance with commands issued from the control circuit.

Since a magnetic card is previously allocated to a client by the bank, a card insert slit if formed on the control panel and a printer is operatively associated with the card insert slit to print information required by him on a printed paper which will be given to him later. The locking and unlocking apparatus is adapted to operate in accordance with results derived from comparison between information introduced onto the magnetic card and information stored in the control circuit.

Preferably, the locking and unlocking apparatus comprises an electromagnetic solenoid adapted to be actuated in response to a signal transmitted from the control circuit, an engagement section disposed on the throw-in door and an actuating mechanism operatively connected to the electromagnetic solenoid so as to allow a locking means to come in engagement or out of engagement with the engagement section.

Generally, the engagement section comprises a locking hole formed on the one side plate of the throw-in door and the locking means comprises a locking rod adapted to come in or come out of the locking hole in response to actuation of the electromagnetic solenoid. The locking rod is actuated by means of an electromagnetic solenoid by way of a linkage mechanism which includes a spring by means which the locking rod is normally urged to come out of the locking hole.

When an electric power supply is interrupted for some reason, the throw-in door can be handled in the conventional manner by actuating a key which has been previously given to a client by the bank.

Other objects, features and advantages of the invention will become more clearly apparent from reading the following description which has been prepared in conjunction with the accompanying drawings.

BRIEF DESCRIPTION OF THE DRAWINGS

The accompanying drawings will be briefly described below.

DETAILED DESCRIPTION OF THE PREFERRED EMBODIMENTS

Now, the present invention will be described in a greater detail hereunder with reference to the accompanying drawings which illustrate preferred embodiments thereof.

Figure 1:
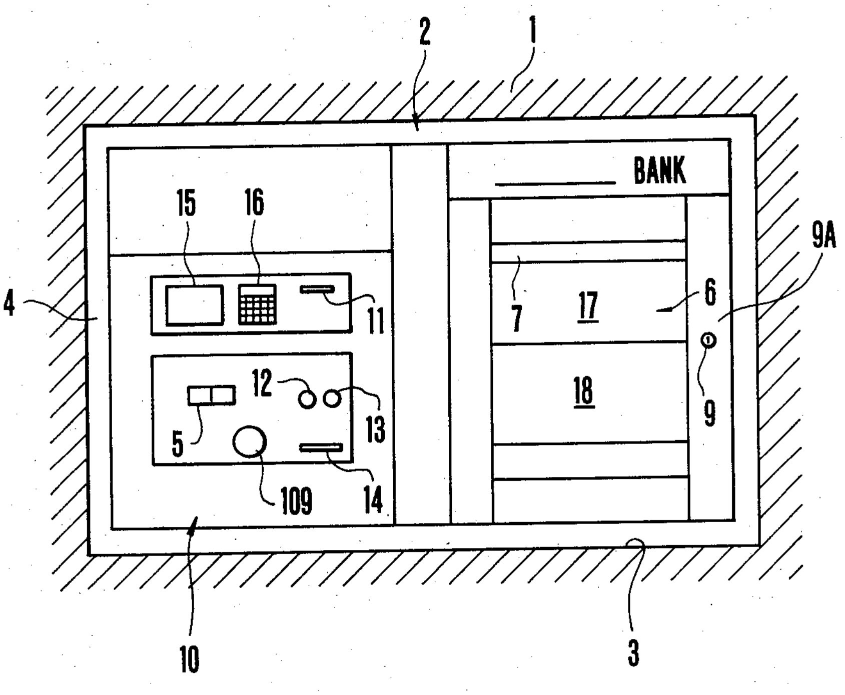
FIG. 1 is a schematic front view of an after hour depository in accordance with an embodiment of the invention.
Figure 2:
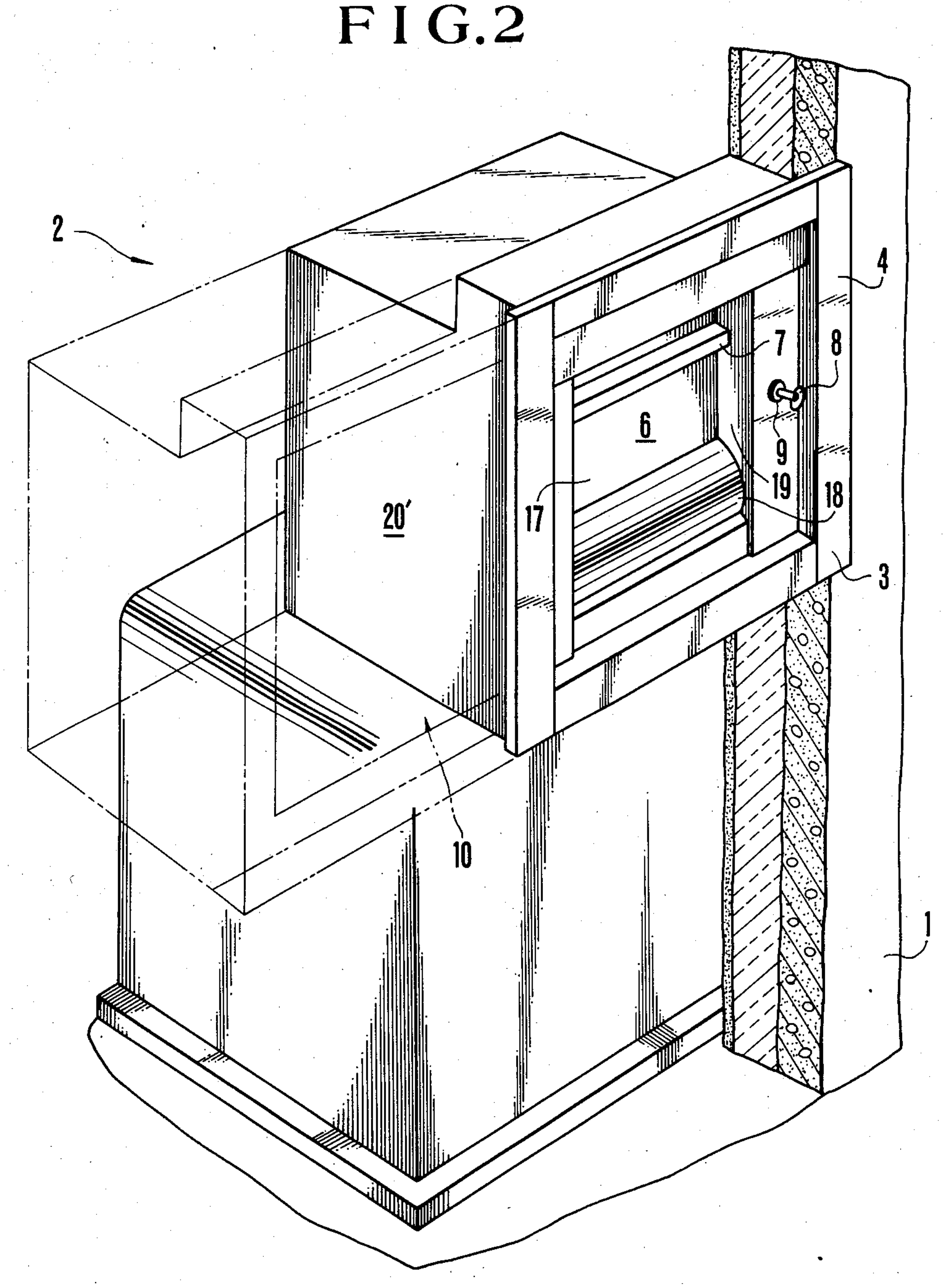
FIG. 2 is a perspective view of the after hour depsitory in FIG. 1, wherein a control panel is illustrated by dotted lines.

As schematically illustrated in FIGS. 1 and 2, an after hour depository 2 to which the present invention is directed is fixed in the wall structure of a building in which a bank transacts its business. Specifically, the wall structure 1 is formed with a rectangular opening 3 into which a frame 4 is fitted for immovabley holding the after hour depository 2. Reference numeral 6 designates a throw-in door rotatably supported within the opening 2. The throw-in door 6 has a handle 7 integrally fitted to the upper part thereof and a key hole 9 is formed on the side frame 9A of the throw-in door so as to allow a key 8 to be inserted into said key hole 9. A control panel 10 is disposed within the frame 4 at the side of the throw-in door 6 as seen in the drawings and an insert slit 11 for inserting a magnetic card therethrough, red and green display lamps 12 and 13, a deposit completion switch 5, a receipt issuance slit 14, a display section 15 for indicating to client how the after hour depository should be handled and a group of push button switches 16 are arranged on the control panel 10 in accordance with a predetermined order. Further, a lighting means such as a lamp or the like for lighting the depository during night hours is disposed at the position located upwardly of the frame 4.

The throw-in door 6 includes a flat front plate 17 of which the lower part is covered with a semicylindrical projection 18 having an axis which extends in a horizontal direction.

Figure 3:
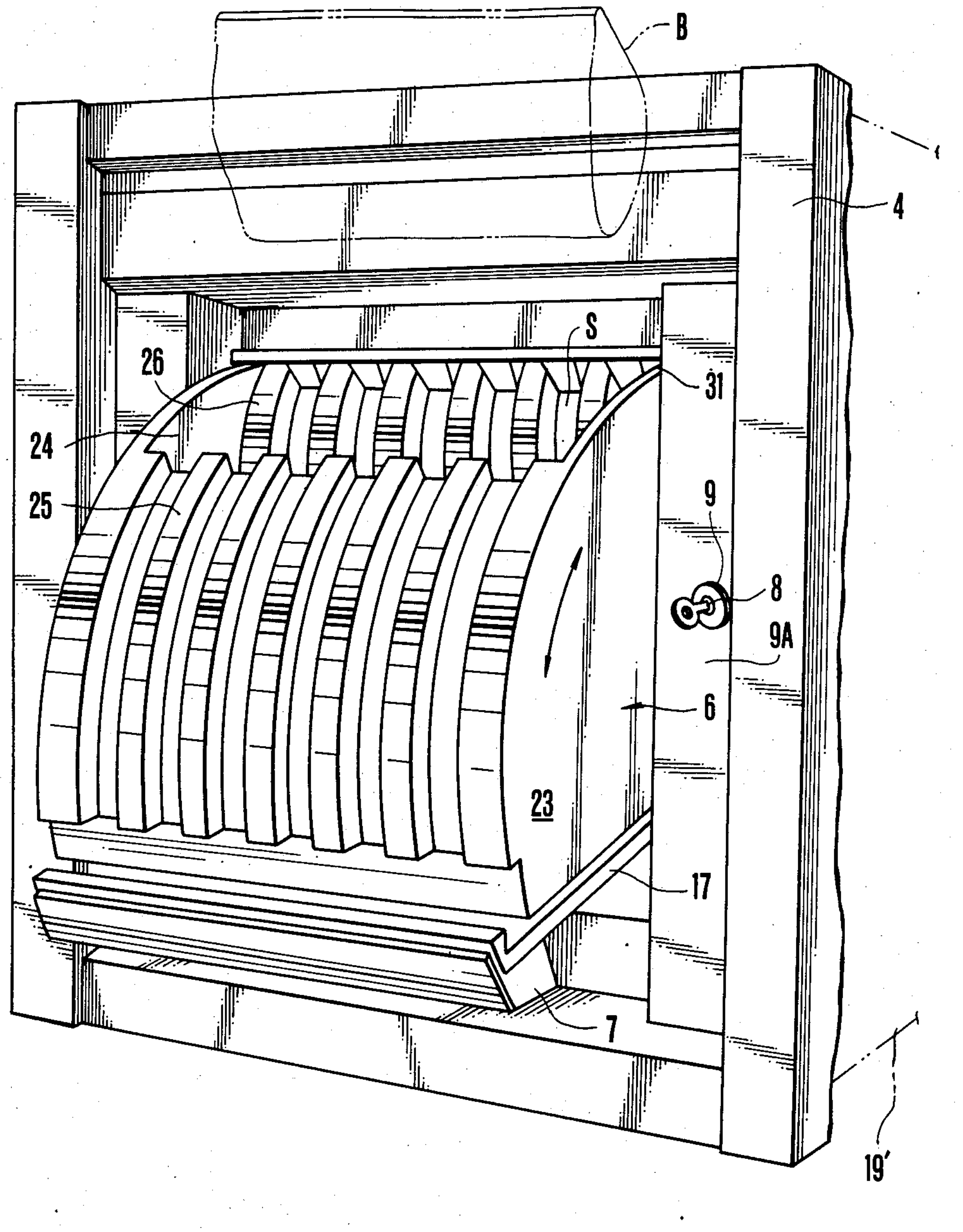
FIG. 3 is a perspective view of the after hour depository in FIG. 1, particularly illustrating a throw-in door and associated components.
Figure 4:
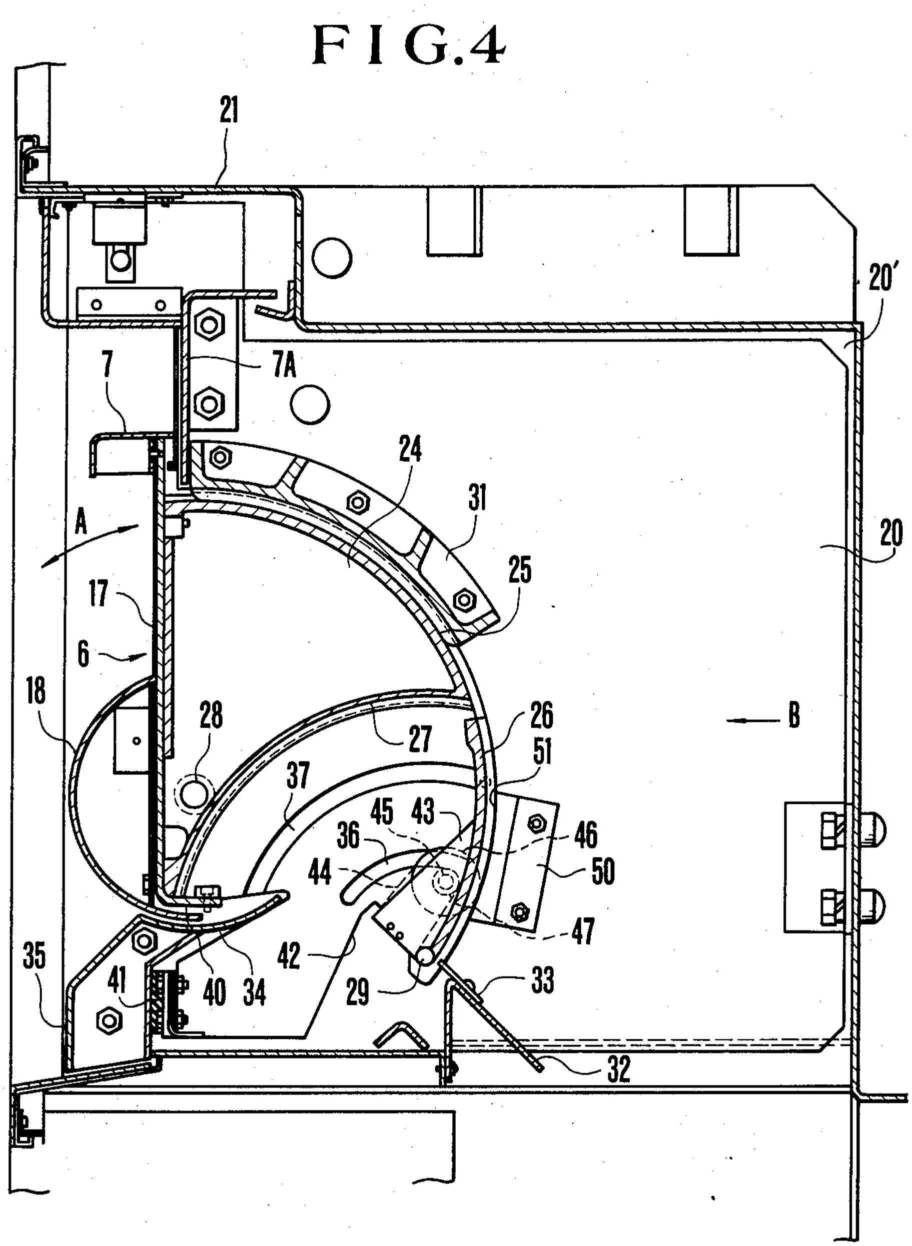
FIG. 4 is a vertical sectional side view of the after hour depository in FIG. 1.

As is apparent from FIGS. 2 to 4, side walls 19 and 20 are disposed at both sides of the throw-in door 6 at the position located behind the frame 4 and an upper wall 21 is bridged between both the upper end parts of the side walls 19 and 20. The throw-in door 6 includes semicircular side plates 23 and 24 made integral with the front plate 17 at both sides thereof and, moreover, it includes a fragmental cylinder member 25 having an upper surface which is corrugated, the side edges of the fragmental cylinder member 25 being made integral with the peripheral edges of the side plates 23 and 24. A horizontally extending shaft 28 fixedly secured to both the side plates 23 and 24 of the throw-in door 6 is caused to extend further through both the side walls 19 and 20 of the depository, to be rotatably supported by the latter. As illustrated in FIG. 4, the fragmental cylinder member 25 is operatively associated with a movable wall 26 in such a manner that the upper end part of the movable wall 26 comes in sliding contact with the semicylindrical partition wall 27 extending between both the side plates 23 and 24, while the movable wall 26 turns about its llower end part.

Figure 10:
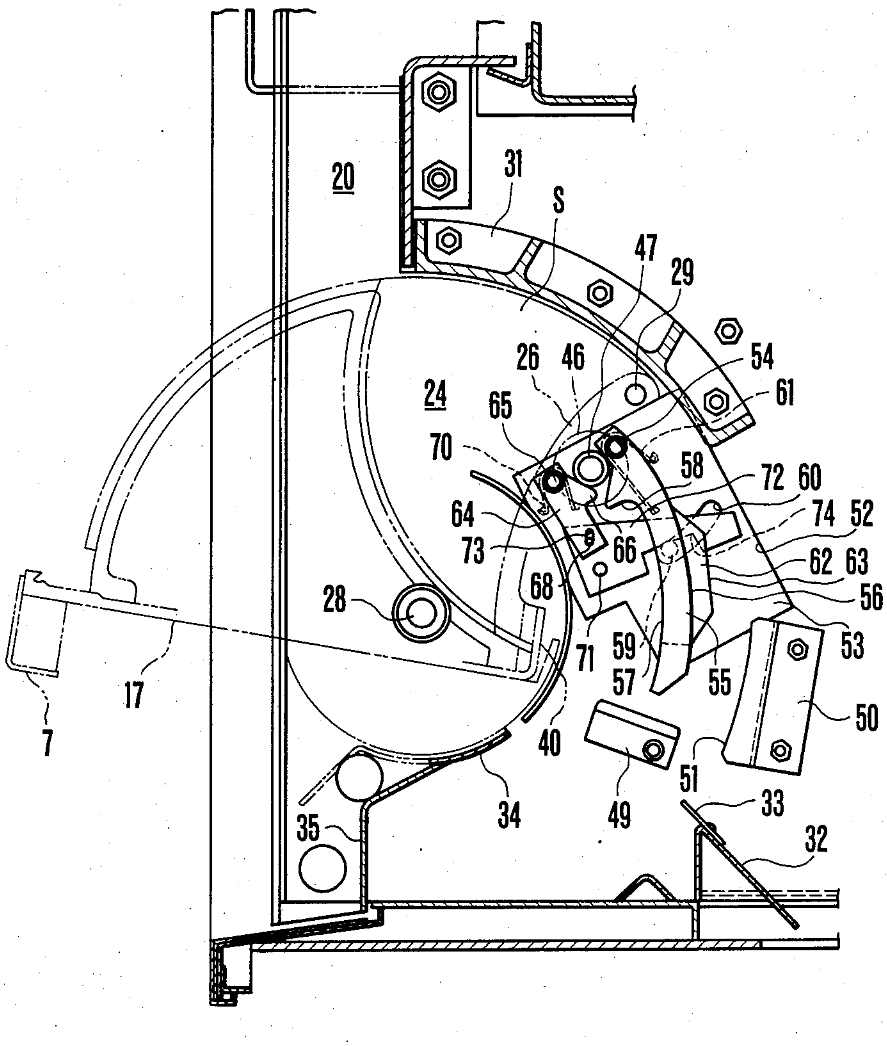
FIG. 10 is a vertical sectional side view of the after hour depository particularly ilustrating that the throw-in door is turned to the first door opened position.
Figure 20:
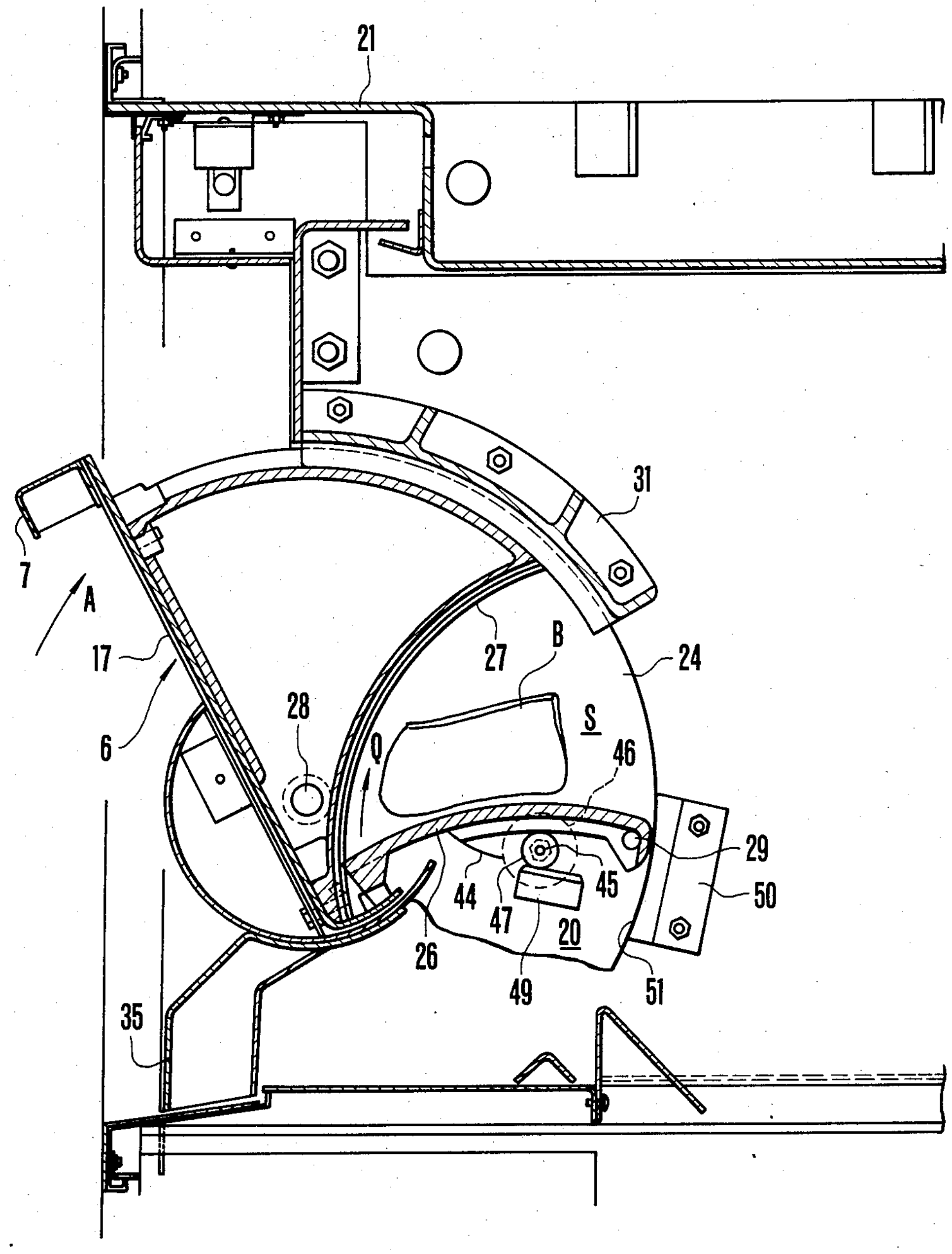

Sspecifically, the movable wall 26 is supported and is rotatable about a shaft 29 constituting the lower end part thereof, said shaft 29 horizontally extending between both the side plates 23 and 24, and when the throw-in door 6 is turned in a counterclockwise direction, as seen in the drawings, until the whole movable wall 26 is located above the shaft 28, the movable wall 26 is caused to turn in the counterclockwise direction due to its own dead weight so that a folding fan-shaped space S is defined between the partition wall 27 and the movable wall 26 (see FIG. 10 and 20). A guide member 31 is fixed between both the side walls 19 and 20 at the position located below the upper wall 21 in such a manner that the corrugated inner surface of the guide member 31 comes in sliding contact with the corrugated outer surface of the fragmental cylinder member 25 during the turning movement of the latter.

An inclined plate 32 is disposed between both the side walls 19 and 20 at the position located downwardly of the movable wall 26 and a defining plate 33 is displaceably mounted on the inclined plate 32, the upper end part of the defining plate 32 being corrugated and corresponding to the corrugated outer surface of the movable wall 26.

A lower cover 35 with a guide member 34 integrally fitted thereto is disposed between both the side walls 19 and 20 at the position located below the semicylindrical projection 18, said guide member 34 being configured to correspond to the semicylindrical surface of the projection 18.

Figure 5:
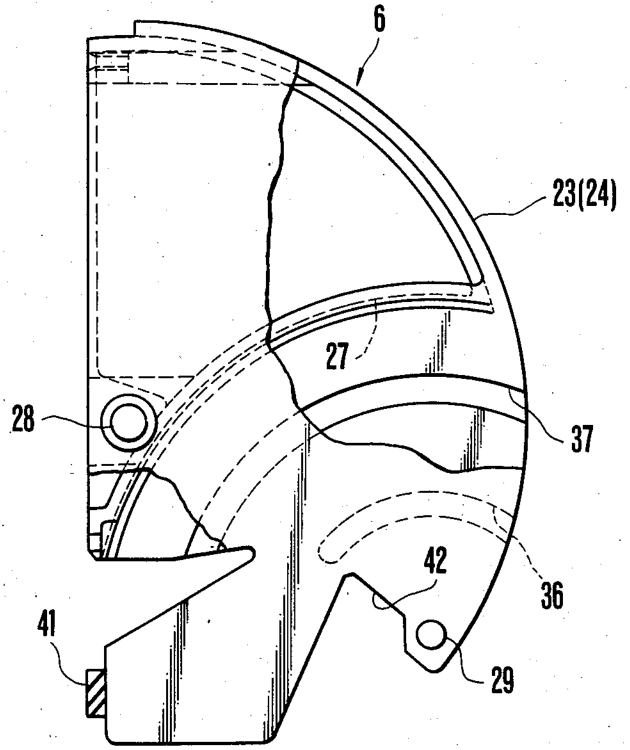
FIG. 5 is a partially sectioned side view of the throw-in door constituting the after hour depository fo the invention.
Figure 6:
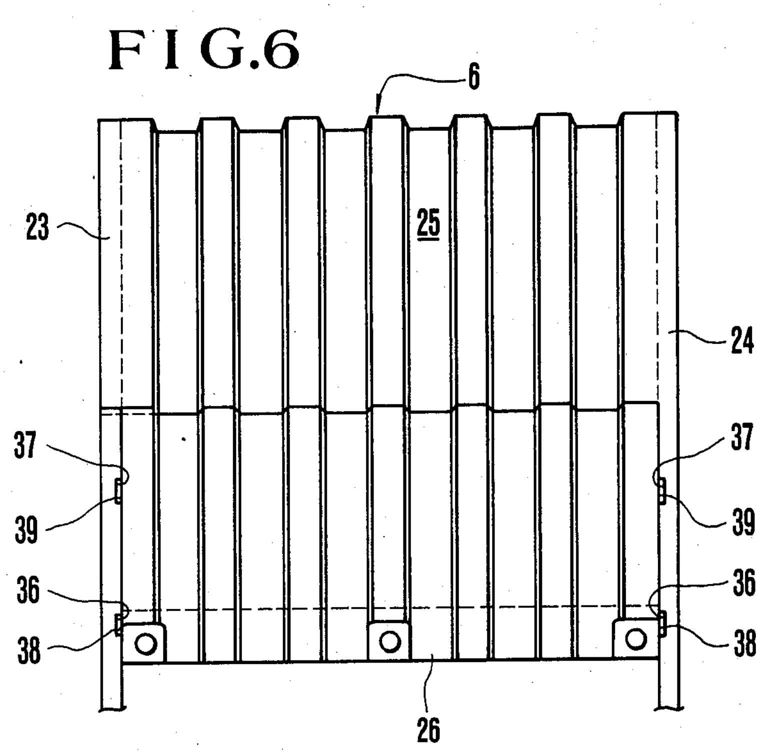
FIG. 6 is a front view particularly illustrating a combination of a throw-in door and guide member.

As illustrated in FIGS. 5 and 6, the side plates 23 and 24 are formed with two circular grooves 36 and 37 on their oppositely located inner surfaces so that horizontally extending pins 38 and 39 on the side edges of the movable wall 26 are brought in engagement to the circular grooves 36 and 37.

As is apparent from FIG. 4, the lower end part of the front plate 17 is bent at a right angle in the horizontal direction so that an abutment portion 40 is formed at the foremost end of the bent part of the front plate 17 so as to allow the uppermost end of the movable wall 26 to abut against the bent part of the front plate 17 when the movable wall 26 is caused to turn to the extreme left end.

Each of the side plates 23 and 24 has a lower extension extending downwardly around the guide member 34 to the position located below the semicylindrical projection 18 until their lowermost end terminates at a shock absorbing member 41 adapted to abut against the rear part of the lower cover 35.

Incidentally, reference letter B as identified by phantom lines in FIG. 3 designates a cash bag which has been carried by a client.

Figure 7:
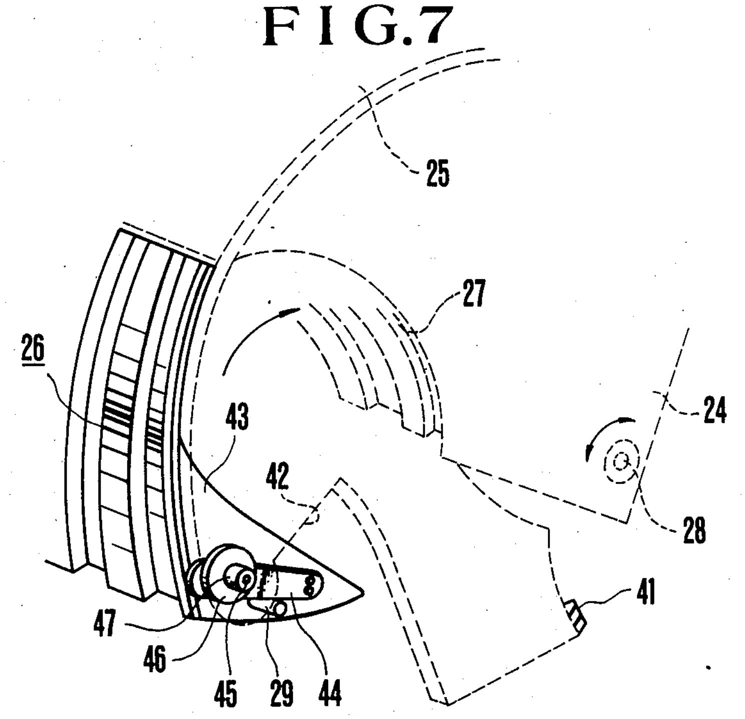
FIG. 7 is a fragmental perspective view of the throw-in door as seen from the rear.

Next, as illustrated in FIGS. 4 and 7, the one side plate 24 has a cutout 42 formed in the proximity of the shaft 29. A thrust plate 43 having a triangular configuration is fixedly secured to the lower end part of the side edge of the movable wall 26 at a right angle relative to the latter. Further, an arm 44 is secured to the thrust plate 43 outwardly of the cutout 42 with the aid of bolts or the like in such a manner that the side plate 24 is interposed between the thrust plate 43 and the arm 44 at its rear end.

Figure 8:
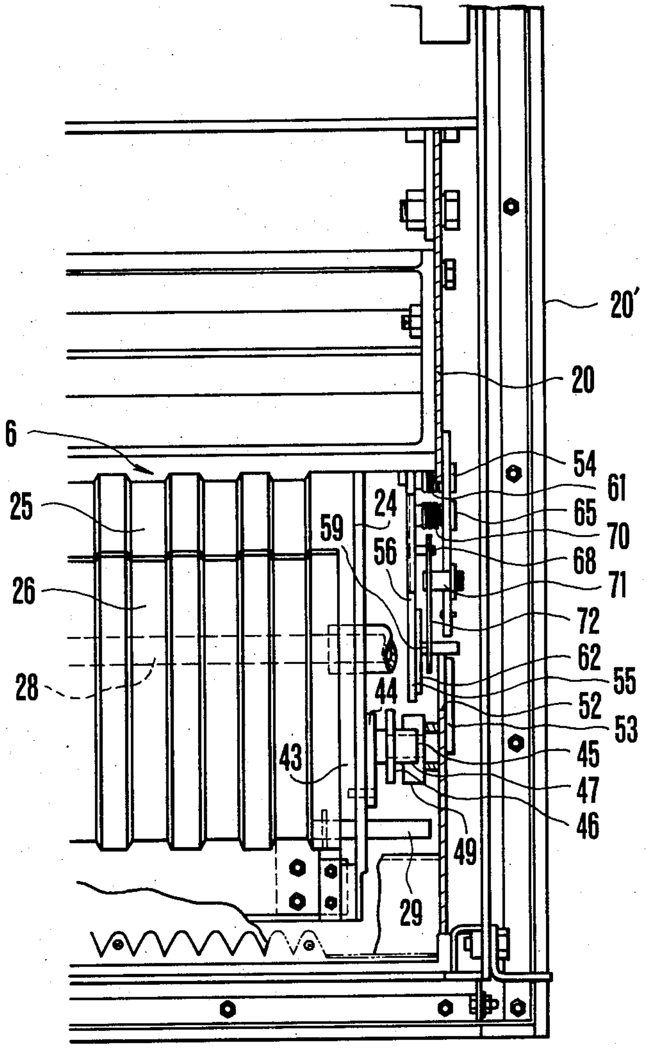
FIG. 8 is a vertical sectional view of the after hour depository of the invention as seen from the rear.
Figure 9:
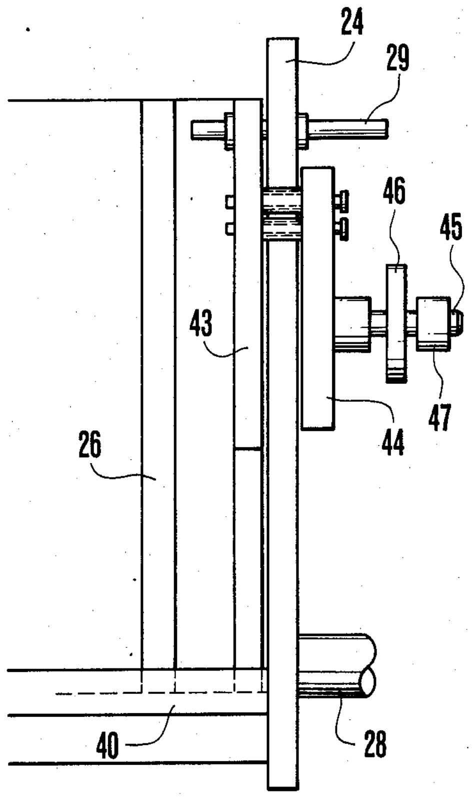
FIG. 9 is a fragmental view of the throw-in door with a movable wall turned upwardly, as seen from the rear.

Thus, as the movable wall 26 is turned, the arm 44 is caused to move together with the thrust plate 43. Referring to FIGS. 7 to 9, a shaft 45 extends in parallel with the shaft 29 at the rear end part of the arm 44 so that a washer, a larger diameter roller 46 and a sleeve roller 47 are rotatably mounted on the shaft 45 without any fear of causing their disconnection from the shaft 45. In the drawings, reference numeral 49 designates a turnover member attached to the side wall 20 at the position located above the shaft 29. The turnover member 49 serves to turn the movable wall 26 in the clockwise direction by allowing the sleeve roller 47 to abut against it when the throw-in door 6 is fully closed, as will be described later.

Referring to FIG. 4 again, a track member 50 is attached to the side wall 20. The track member 50 has an inner surface 51 having an arched configuration which is designed to extend along the same circular track as that of the guide member 31. The roller 46 is adapted to come in rolling contact with the inner surface 51 of the track member 50. Thus, while the throw-in door 6 is kept closed, the movable wall 26 is inhibited from turning in the counterclockwise direction. When the throw-in door 6 is turned in the counterclockwise direction, the roller 46 is caused to roll on the inner surface 51 of the track member 50 whereby the uppermost end part of the movable wall 26 is displaced toward the inner surface of the guide member 31.

Referring to FIGS. 8 and 10, the side wall 20 is formed with a cutout 52 at its central part and a plate 53 is secured to the side wall 20 in such a manner as to cover the cutout 52 therewith. The plate 53 has a pin 54 projected inwardly therefrom at the position located at its upper end and a latch 55 is turnably supported on the free end of the pin 54. The latch 55 has an outer surface 56 which has a circular configuration designed substantially identical to that of the guide member 31 which is a part of a circle as described by utilizing the axis of the shaft 28 as a center of circle. Thus, the sleeve roller 47 on the shaft 45 is brought in abutment against the outer surface 56 of the latch 55 in the course of the opening movement of the throw-in door 6 (in the counterclockwise direction, as seen in the drawing) and thereafter it rolls on the outer surface 56.

Further, the latch 55 has an engagement pawl 58 projected on the inner surface 57 at its upper end. Moreover, it has an engagement pin 59 projected in the direction oriented toward the side wall 20 at its middle. The engagement pin 59 is displaceably inserted through an elongated hole 60 on the plate 53, said elongated hole 60 having an arched configuration, so that the extent of turning movement of the latch 55 is limited. It should be noted that the latch 55 is normally urged to turn in the clockwise direction (as seen in FIG. 10) with the aid of the resilient force of a spring 61 spirally mounted on the pin 54.

In the drawings, reference numeral 62 designates an auxiliary plate fitted to the latch 55 in the parallel relation by using bolts or the like means. The outer surface 63 of the auxiliary plate 62 is shaped to an arched configuration so that the shaft 29 moves along the outer surface 63 of the auxiliary plate 62 irrespective of the direction of the turning movement of the throw-in door 6.

Further, an auxiliary latch 64 is supported, rotatably about a pin 65 at the position located opposite to the latch 55, on the same plane of the latter. A feed pawl 66 is projected from the auxiliary latch 64 toward the latch 55. The feed latch 66 is located upwardly of the latch 55 as seen in the drawings and they are spaced away from one another at a predetermined distance.

The auxiliary latch 64 has a connection pin 68 projected therefrom at its lower end in the same direction as that of the engagement pin 59. Moreover, it is normally urged to turn in a counterclockwise direction (as seen in FIG. 10) with the aid of the resilient force of a coil spring 70 spirally mounted on the pin 65. A pin 71 having a length shorter than that of the pin 65 is projected on the plate 53 in the same direction as that of the pin 65 at the position located below the pin 65. A connection plate 72 is supported, rotatable about the pin 71 in such a manner that the lower end of the auxiliary latch 64 is superimposed on the connection plate 72. This connection plate 72 is formed with an elongated hole 73 at its upper left end part through which the connection pin 68 is inserted. A cutout 74 is provided at the lower middle part of the connection plate 72 so as to allow the connection pin 59 to engage the cutout 74.

Owing to the above described arrangement, the connection plate 72 is normally urged to rotate about the pin 71 in the clockwise direction (as seen in FIG. 10) under the influence of the rotational force transmitted from the auxiliary latch 64 by way of the connection pin 68. The cutout 74 serves to limit the range of turning movement of the latch 55 with the aid of the engagement pin 59 adapted to be engaged to the cutout 74.

Next, FIGS. 11 to 15 illustrate an example of a locking and unlocking apparatus for the depository. This locking and unlocking apparatus is so constructed that the throw-in door 6 can be opened to the first door opened position necessitating the use of a key or magnetic card when a cash bag is used for depositing, money or without necessitating the use of a key or magnetic card when an envelope is used for depositing money.

A first locking mechanism 75 is arranged in the area located behind the key hole 9. The electromagnetic solenoid 76, operatively associated with the first locking mechanism 75, is fixedly attached to the wall face 7A at the position located above the guide member 31.

Figure 11:
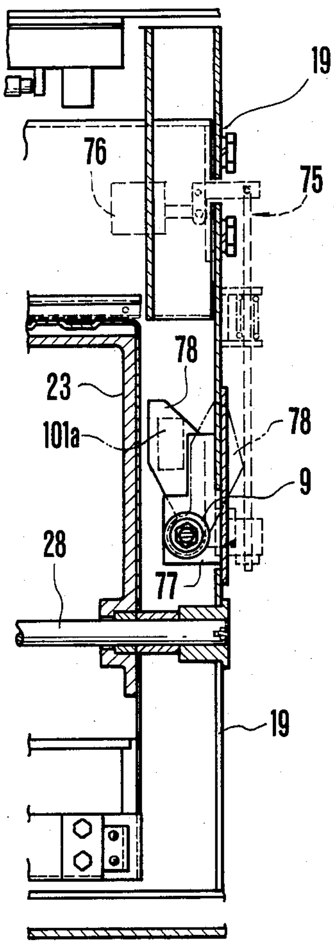
FIG. 11 is a fragmental vertical sectional front view of the after hour depository, particularly illustrating the first locking and unlocking apparatus.
Figure 12:
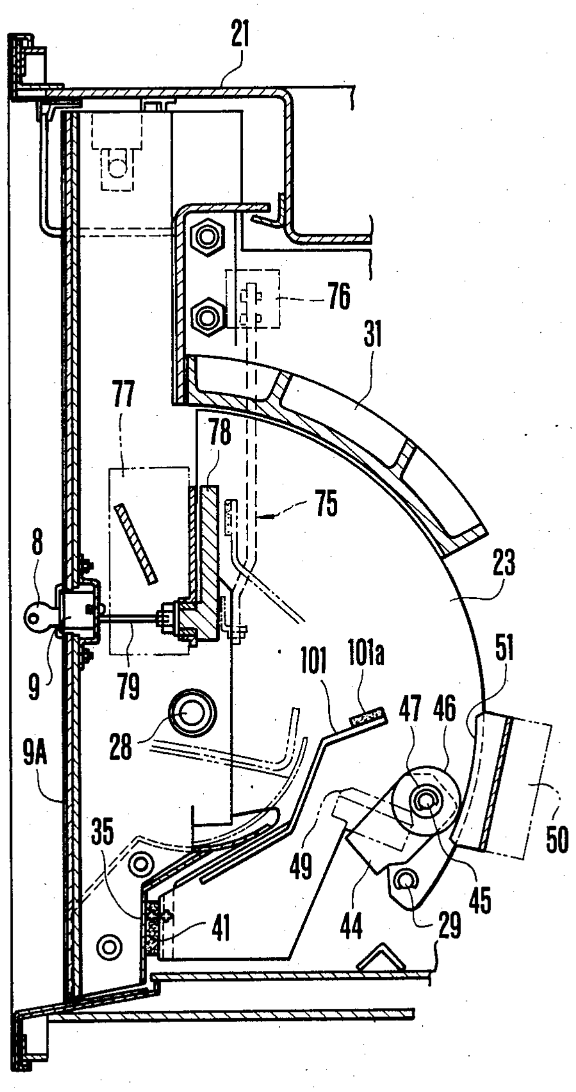
FIG. 12 is a vertical sectional side view of the after hour depository, particularly illustrating the first locking and unlocking apparatus in FIG. 11.
Figure 13:
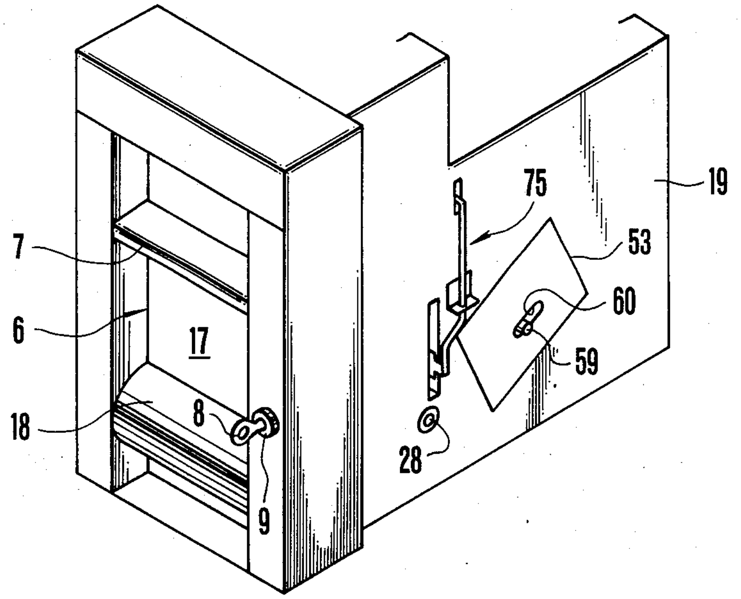
FIG. 13 is a perspective view of the after hour depository, particularly illustrating the first locking and unlocking apparatus in Rig. 11.

As illustrated in FIGS. 11 and 12, a bracket 77 is attached to the side wall 19 at the position located on the axis extending rearwardly of the key hole 9. A locking lever 78 is supported, turnable, about the same axis as that of the key hole 9. The key hole 9 is operatively connected to the locking lever 78 by way of a connection rod 79 so that the locking lever 78 is turned to the position as identified by phantom lines in FIG. 11 when a key 8, inserted into the key hole 9, is actuated. The locking lever 78 is integrally provided with a lever plate 81 and an elongated hole 80 formed thereon. The lever plate 81 being located at the right side of the locking lever 78, and a guide plate 83 having the L-shaped configuration is secured to the side wall 19 at the intermediate position between the locking lever 78 and the electromagnetic solenoid 76. A horizontal portion 82 extending from the guide plate 83 is formed with a hole 84, and the electromagnetic solenoid 76 has a solenoid plate 85 adapted to be displaced leftwardly and rightwardly in parallel with the shaft 28. Further, a L-shaped connection plate 86 is rotatably supported on the wall face 7A. The left end part of the connection plate 86 is pivotally connected to the right end part of the solenoid plate 85 as seen in the drawings. The right end part of the connection plate 86 is pivotally connected to the upper end of the locking rod 87, displaceably inserted through the hole 84 of the guide plate 83.

The lower end part of the locking rod 87 is connected to the horizontal portion of the L-shaped link plate 88 by means of nuts 89. The position of the link plate 88 as seen in the vertical direction can be adjusted by rotating the nuts 89.

The vertical portion of the link plate 88 has a pin 90 loosely inserted through the elongated hole 80 on the locking lever 78. The locking rod 87 has a washer 91 secured to the central part thereof.

Figure 14:
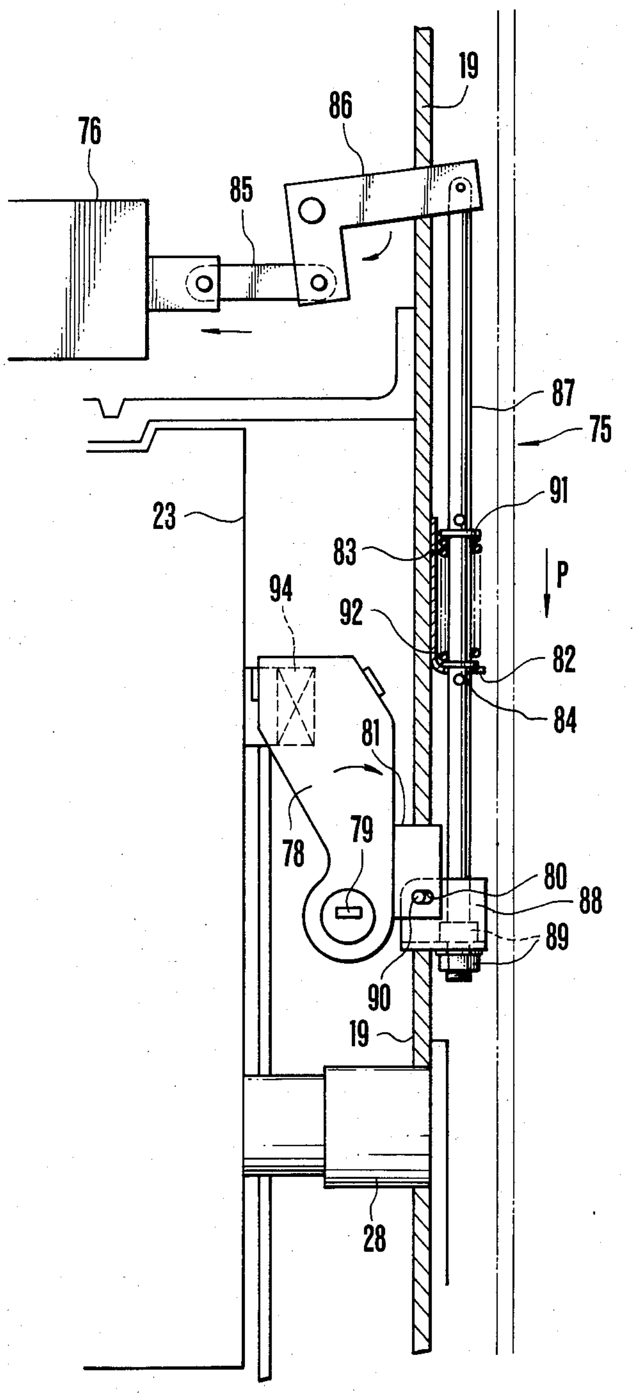
FIG. 14 is a fragmental vertical sectional front view of the after hour depository in FIG. 11, shown in and enlarged scale.
Figure 15:
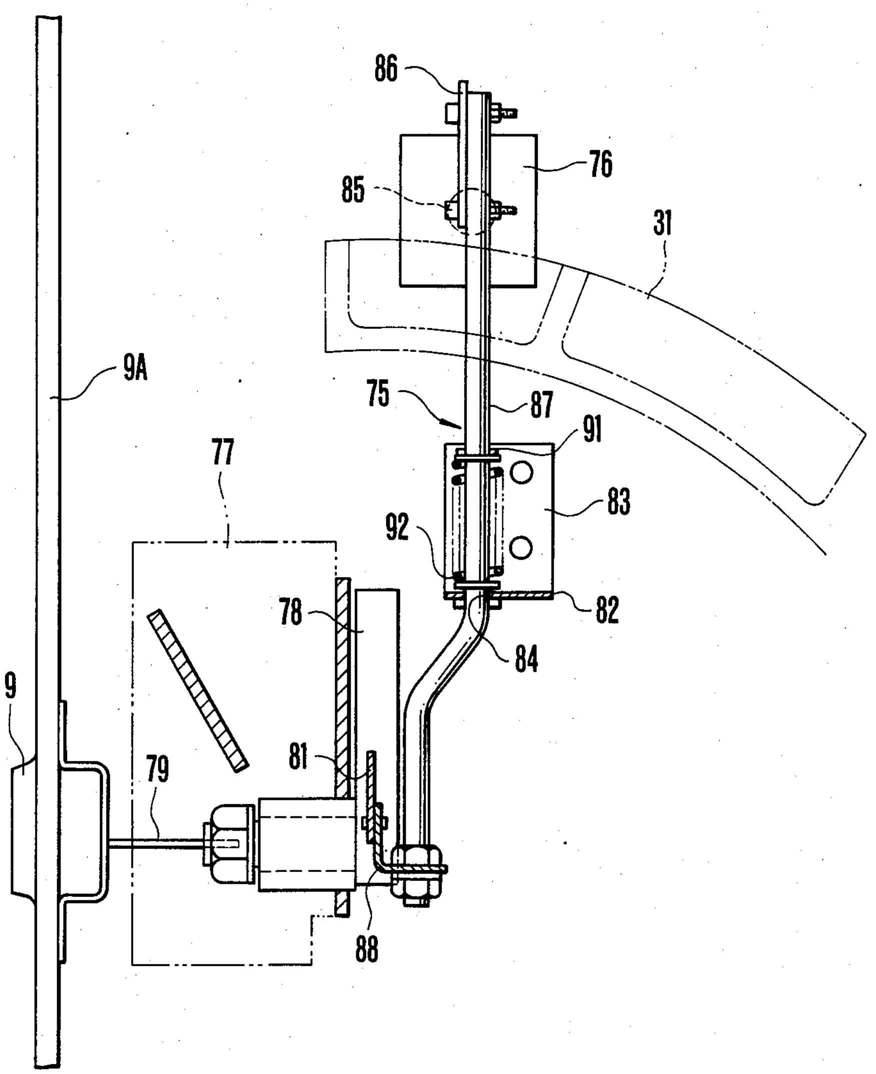
FIG. 15 is a fragmental vertical sectional side view of the after hour depository in FIG. 12, shown in an enlarged scale.

A coil spring 92 is disposed between the washer 91 and the horizontal portion 82 of the guide plate 83 so that the locking rod 87 is urged in the direction opposite to that identified by an arrow P in FIG. 14. Thus, the locking lever 78 is normally urged in the counterclockwise direction in FIG. 14 by means of the spring 92 via the link plate 88, the pin 90 and the lever plate 81.

In FIGS. 11 and 12 reference numeral **101*a* designates a stopper fixed to the arm 101. The stopper 101*a* is made of elastomeric material and is arranged such that it abuts against the locking lever 78 (as illustrated by real lines in FIGS. 11 and 12) when the throw-in door 6 is turned to the first door opened position (as illustrated by phantom lines in FIG. 10). Once the throw-in door 6 has assumed the first door opened position, further turning movement is inhibited by means of the locking lever 78. The throw-in door 6 can be turned to the second fully opened door position (as illustrated in FIG. 3) by turning the locking lever 78 to the position as identified by phantom lines in FIG. 11 with the aid of the key 8 or the electromagnetic solenoid 76**.

Figure 16:
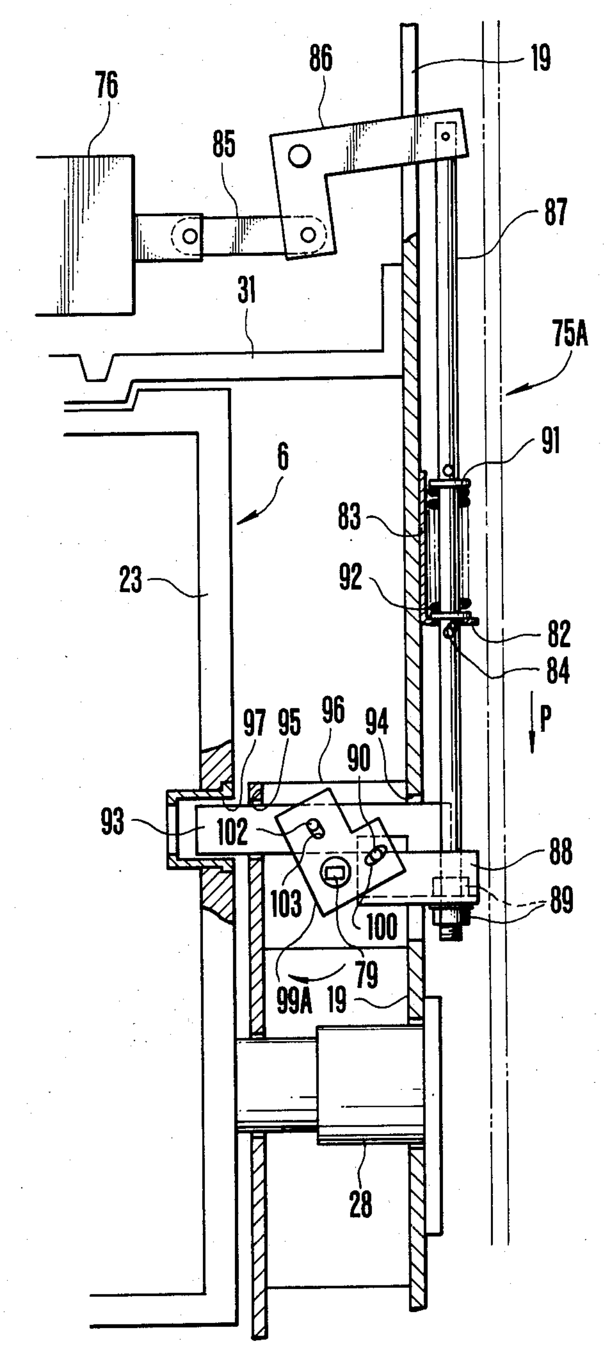
FIG. 16 is a fragmental vertical sectional front view of the after hour deposital, particularly illustrating the second locking and unlocking apparatus in an enlarged scale.
Figure 17:
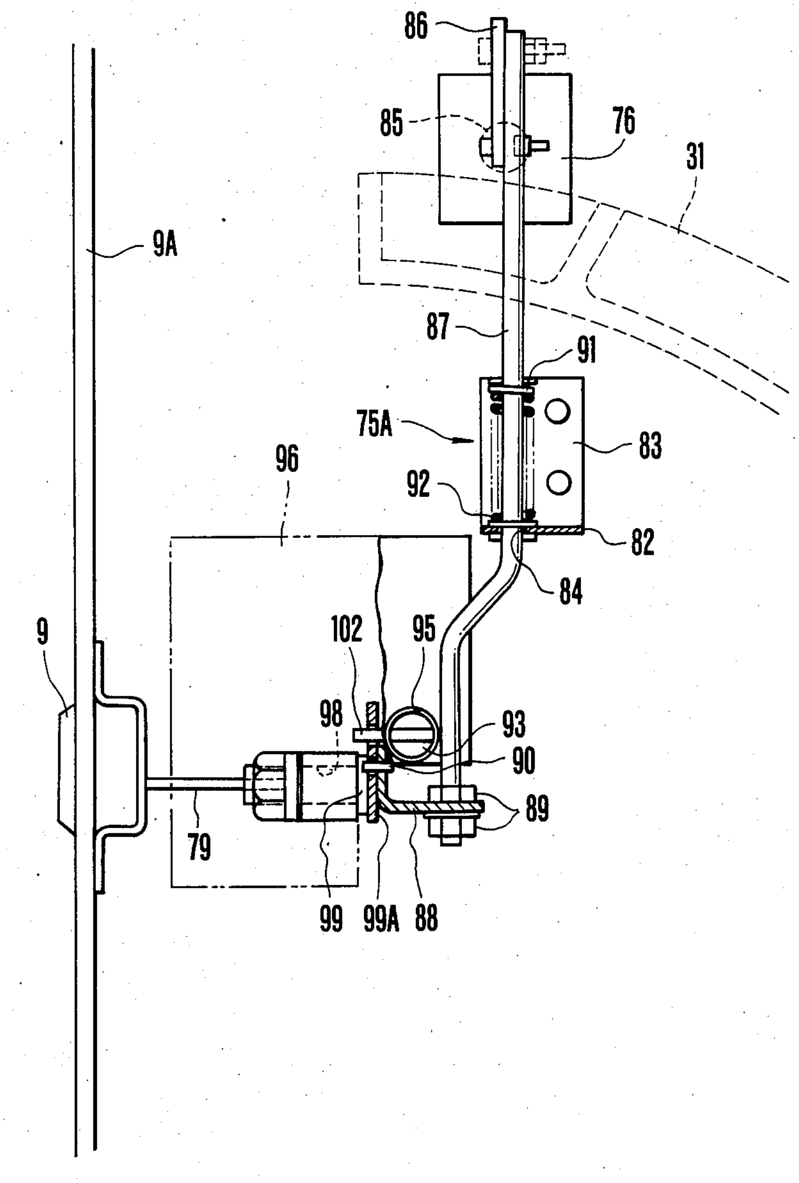
FIG. 17 is a fragmental vertical sectional side view of the after hour depository in FIG. 16, shown in an enlarged scale.

Next, FIGS. 16 and 17 illustrate a second locking apparatus which allows only the second fully opened door position to be assumed. When the throw-in door 6 is to be turned, a client is required to carry his key or magnetic card at all times. A second locking mechanism 75A is provided in the area located behind the key hole 9.

A hole 94 is formed on the side wall 19 at the position located in the proximity of the lowermost end of the locking bar 87. A U-shaped bracket 96 with a hole 95 formed thereon is secured to the inner surface of the side wall 19, wherein both the holes 94 and 95 have the same diameter and are located in horizontal alignment with one another. The side plate 23 of the throw-in door 6 is formed with a locking hole 97 which serves for engagement. When the throw-in door 6 assumes the door closed position as illustrated in FIG. 4, the locking hole 97 is located in horizontal alignment with the holes 95 and 94 and has the same diameter as that of the latter. In the drawings, reference numeral 93 designates a locking rod, slidably inserted through the holes 94 and 95, to come in engagement to, or out of engagement from, the locking hole 97.

A third hole 98 is formed on the bracket 96 at the position located in longitudinal alignment with the connection rod 79. A shaft member 99 is rotatably supported in the third hole 98 with its one end connected to the connection rod 79 by means of groove in coaxial relation.

On the other hand, the other end of the shaft member 99 has a rotary plate 99A secured thereto. As is apparent from FIG. 16, an elongated hole 100 is formed at the right end of the rotary plate 99A so as to allow a pin 90 on the link plate 88 to be inserted therethrough.

The locking rod 93 has a pin 102 projecting from its middle part which is loosely inserted through an elongated hole 103 formed at the left end of the rotary plate 99A. Thus, when the rotary plate 99A is rotated in the clockwise direction as seen in FIG. 16, by actuating the key 8 or the electromagnetic solenoid 76, the locking rod 93 is disengaged from the locking hole 97, whereby it is released from the locked state.

Figure 18:
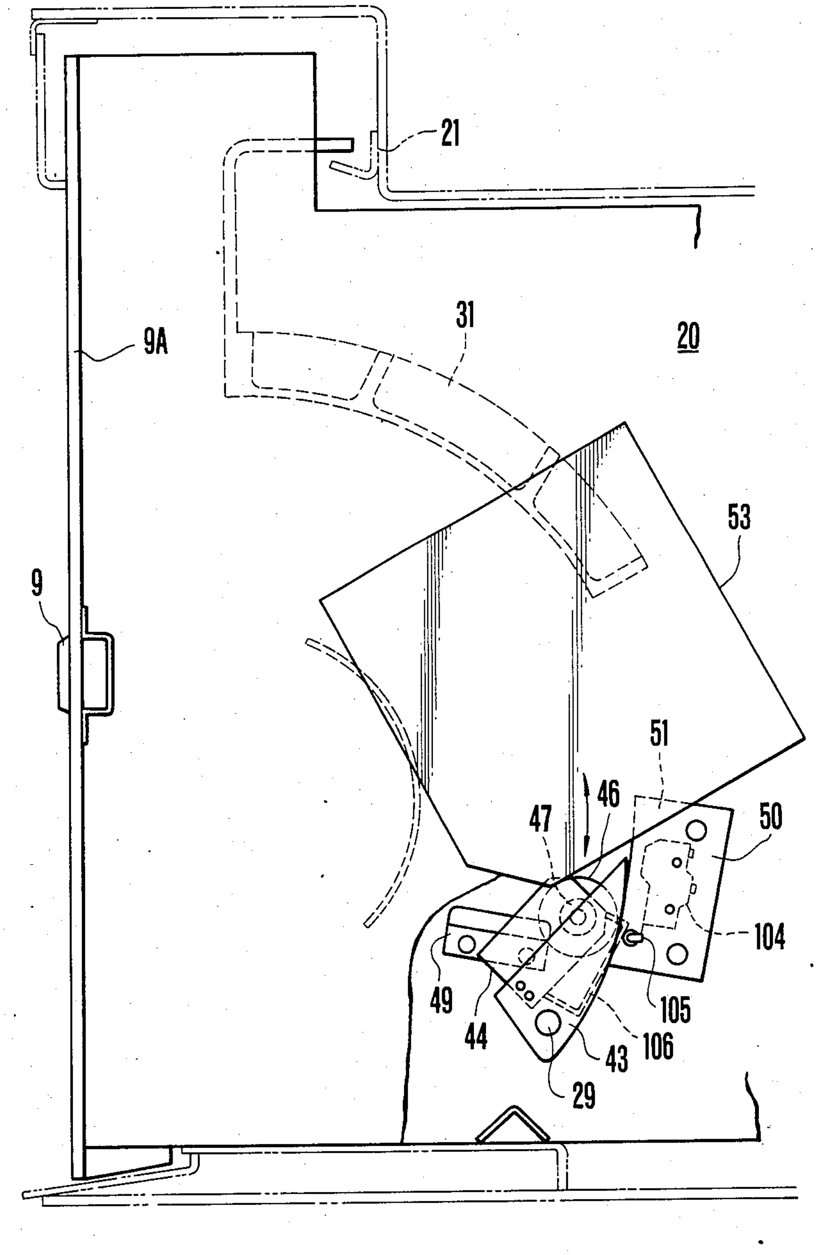
FIG. 18 is a fragmental vertical sectional side view of the after hour depository, particularly illustrating how a sensing switch is disposed in the depository.

In FIG. 18 reference numeral 104 designates a microswitch firmly attached to the track member 50 at a position located in the proximity of the side wall 20. To actuate the microswitch 104 the arm 44 is provided with an actuating plate 106, adapted to come in contact with a contact piece 105 on the microswitch 104. When the throw-in door 6 assumes the door closed position, that is, when the thrust plate 43 and the arm 44 are located at the position as shown in FIG. 18, the microswitch 104 is operated such that it is turned on or off by means of the actuating plate 106. On the other hand, when the actuating plate 106 is parted away from the contact piece 105 by causing the throw-in door 6 to be turned in the direction of closing (as illustrated in FIG. 4), the microswitch is operated in the reverse manner to the foregoing case and thereby it is turned off or on.

Figure 19:
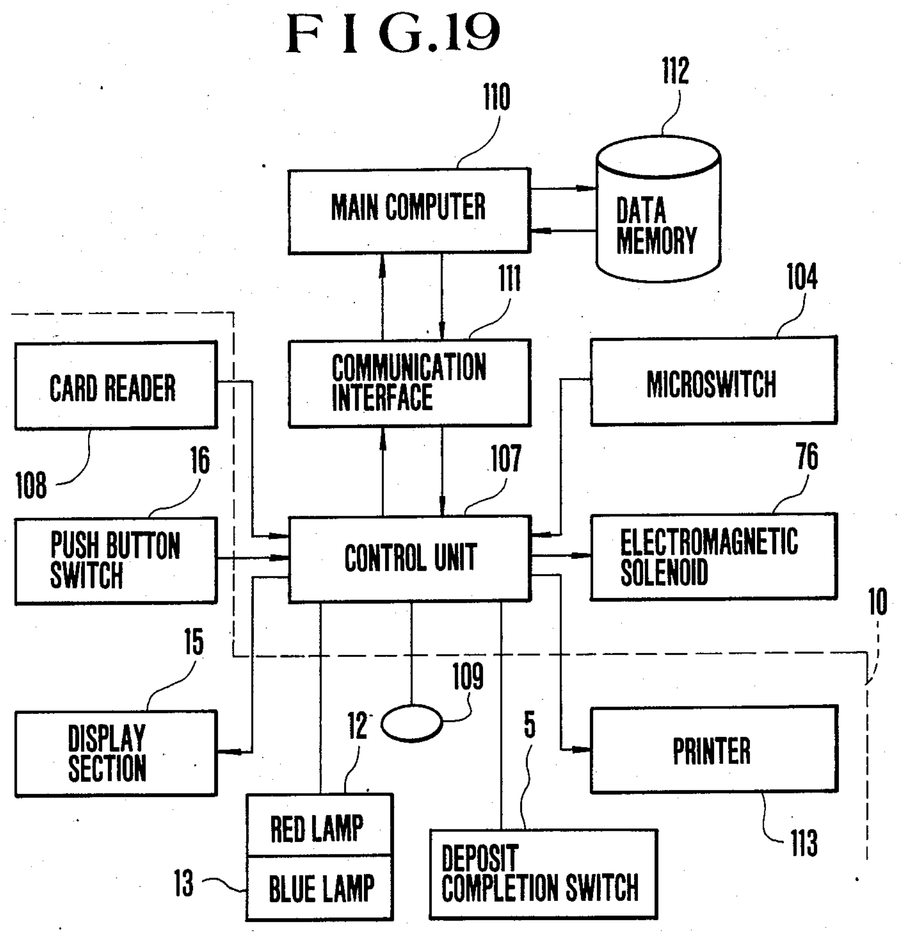
FIG. 19 is a block diagram of a control circuit for the after hour depository and FIG. 20 is a vertical sectional side view of the after hour depository of the invention, particularly illustrating how the throw-in door is turned to handle a cash bag.

FIG. 19 schematically illustrates how a control apparatus for controlling the after-hour depository of the invention is constructed. In the drawing, reference numeral 107 designates a control unit which serves as a central component for control operations. The control unit 107 is electrically connected to card reader 108 disposed behind the card insert slit 11, push button switches 16, deposit completion switch 5, display section 15 and printer 113, disposed behind the receipt issuance slit 14 and arranged on the control panel 10 in accordance with the layout as illustrated in FIG. 1.

Further microswitch 104 for detecting whether the throw-in door 6 is opened or closed, electromagnetic solenoid 76 serving as an unlocking unit for the throw-in door 6 and speaker 109 for generating an alarm sound, are also electrically connected to the control unit 107. The speaker 109 is arranged on the control panel 10. Reference numeral 110 designates a main computer in which a clock having a capability of adjusting for leap year, memory for storing determination of invalidity of magnetic card, sound generating section for the speaker 109 and circuit for the sound generating section are incorporated.

The main computer 110 and the control unit 107 are electrically connected to one another via a communication interface 111. The main computer 110 is electrically connected to a data memory 112 such as magnetic tape, disc or the like.

The control panel 10, the main computer 110 and the control unit 107 are located at a different position from the throw-in door 6. Further, they can be assembled separately or individually.

Next, operation of the after hour depository will be described below.

When a client inserts his card into the insert slit 11 as shown in FIG. 1, the card reader 108 reads the content contained in the card, that is, recorded information which is then transmitted to the control unit 107. The information contained in the card comprises the bank code, branch office code, term of validity, client name, and account number or the like. A signal indicating card insertion is first transmitted to the main computer 110 via the communication interface 111. Card insert time is then stored in the main computer 110. Next, information obtained from the data memory 112 via the main computer 110 and the communication interface 111 are compared with those from the card in the control unit 107. When it is confirmed that the information contained in the card is correct, a green display lamp 13 is caused to light and at the same time code information in the card is temporarily stored in the main computer 110.

However, when the inserted card is not correct, that is, information in the card is not identical to that stored in the data memory, or some malfunction takes place, a red display lamp 12 is caused to light. In response to this, the inserted card is rejected and indication such as wording "insert correct card" or the like appears on the display section 15.

An unlocking signal is transmitted from the control unit 107 to the electromagnetic solenoid 76 at the same time that the green display lamp 13 is lit when a correct card is inserted. This causes the solenoid plate 85 as shown in FIG. 14 to be displaced in the leftward direction. Then, the connection plate 86 is rotated in the clockwise direction and the locking rod 87 is slidably displaced against the resilient force of the spring 92 in the direction as identified by an arrow P in the drawing. At this moment, the locking lever 78 is rotated in the clockwise direction via the link plate 88, the pin 90 and the lever plate 81, whereby it is displaced from the moving track of the stopper 101a to the position as identified by phantom lines in FIG. 11. Now, the client may turn the throw-in door 6 about the shaft 28 by pulling the handle 7 forward with his hand placed thereon until the position as shown in FIG. 3 is assumed. Subsequently, the movable wall 26 is displaced upwardly while it is guided by means of the guide member 31. When it assumes a position located above the shaft 28, it is caused to turn about the shaft 29 due to its own dead weight until its foremost end abuts against the receiving portion 40. Thus, a folding fan-shaped space S as illustrated in FIG. 10 is produced in the area located behind the fragmental cylinder member 25. The client puts his cash bag B into the pocket of space S, said cash bag B being previously allocated to him by the bank. As is apparent from FIG. 18, the arm 44 is rotated as the throw-in door 6 is turned, whereby, the actuating plate 106 is parted away from the contact piece 105 on the microswitch 104 from which a signal is then transmitted to the control unit 107.

As illustrated in FIG. 20, the throw-in door 6 is pushed back by the client's hand in the direction as identified by an arrow A while his cash bag B is held in the space S as defined by the partition wall 27, the side plates 23 and 24 and the movable wall 26. In the course of the turning movement of the throw-in door 6, the sleeve roller 47 on the arm 44 disposed at the side of the movable wall 26 comes in abutment against the turn-over member 49 on the side wall 20. As the client further pushes the throw-in door 6 by the handle 7, to turn it about the shaft 28 further in the clockwise direction, the movable wall 26 is caused to turn about the sleeve roller 47 on the arm 44 in the direction as identified by an arrow Q. As a result, the cash bag B slides down along the upper surface of the movable wall 26 toward a safe room located behind the throw-in door 6.

Referring to FIG. 18 again, the actuating plate 106 on the arm 44 abuts against the contact piece 105 on the microswitch 104 so that a signal of the door closing, is transmitted to the control unit 107.

In the case where a single specific cash bag B is allocated to each of its clients by the bank, the control unit 107 causes the electromagnetic solenoid 76 to be turned off when it receives a signal of door closing. Thus, the locking lever 78 is turned to the locking position with the aid of the resilient force of the spring 92, whereby the throw-in door 6 is brought into the locked state.

Next the printer 113 prints data such as date and time of money deposition, number of cash bags, client's code, bank's code and other information on a printing paper in accordance with a command issued from the control unit 107 and thereafter a receipt is delivered from a receipt issuance slit 14. At this moment the magnetic card is returned, accompanied by an alarm sound generated by the speaker 109. The alarm sound is interrupted immediately after the magnetic card is removed from the control panel. In the case where a plurality of cash bags are allocated to a client, this fact is inputted by actuating a certain push button switch selected from a group of push button switches 16 after a green display lamp 13 is lit. When the control unit 107 receives a signal concerning plural cash bags, it causes the electromagnetic solenoid 76 to be turned on whereby the client can open the throw-in door 6 again. After the client puts a final cash bag B on the throw-in door 6, he actuates the deposit completion switch 5. In response to this, the control unit 107 causes the electromagnetic solenoid 76 to be turned off when the throw-in door 6 is closed. Subsequent operations are same as those in the case where a single cash bag is used.

When a client loses his magnetic card, determination of invalidity is inputted by actuating the switch 16. The act of actuating the switch 16 is then stored in the main computer 110.

Incidentally, the structure and operation of the latch 55 and the auxiliary latch 64 are the same as those described in Japanese Patent Application No. 172538/82 (corresponding to U.S. patent application Ser. No. 469,311) and therefore repeated description will not be required.

Information temporarily stored in the main computer 110 is transferred to the date memory 112 so that they are read out again by the main computer as required.

When the electromagnetic solenoid 76 fails to be actuated because the electric power supply is interrupted or because a client forgets to carry his magnetic card the throw-in door 6 can be opened in the conventional manner by manually actuating his key 8.

As described above, the after hour depository feature of the invention makes it possible to prepare a receipt for him on which various data as to how the after hour depository can be utilized by him are printed in detail. Another advantageous feature of the invention is that it is possible to make a determination of invalidity of the magnetic card, when a client loses his card. Moreover, it is possible to make a determination as to the term of validity of his card.

Another advantageous feature of the invention is that since a throw-in door can be installed independently, a control panel, control unit and other components can be additionally mounted later in accordance with a budget specified to the after hour depository. Moreover, an existing after hour depository which has been installed can be improved as required in accordance with the invention.

When the power supply is interrupted for some reason, the after hour depository can be operated in the conventional manner by actuating a client key.

While the present invention has been described above with respect to a few preferred embodiments, it should of course be understood that the present invention should not be limited only to those embodiments but various changes or modifications may be made in a suitable manner without departure from the spriit and scope of the invention.

What is claimed is:

1. In an after-hour depository, powered by electricity, of a type including a throw-in door turnably housed in a frame fitted into an opening on a building, said throw-in door comprising a fragmental cylinder member and a movable wall, and being adapted to operate such that when a client uses an envelope as a depositing means, said throw-in door assumes a first door opened position creating a V-shaped pocket defined between the partition wall of the fragmental cylinder member and the movable wall when said throw-in door is half opened, and when said client uses a cash bag as a depositing means, said throw-in door assumes a second door opened position where said pocket is fully opened, the improvement consisting of said depository further including;

- a control panel to control the turning movement of said throw-in door,
- a control circuit electrically connected to said control panel and having a data memory for filing client related information within said data memory, and
- a locking and unlocking apparatus to lock or unlock said throw-in door in accordance with a command issued from said control circuit.

2. An after-hour depository as defined in claim 1, wherein a card insert slit for inserting a magnetic card therethrough is formed on said control panel and said depository further includes a printer operatively associated with said card insert slit so that said locking and unlocking apparatus is actuated by reference to a comparison between information inputted into said magnetic card and information stored in the control circuit, and said comparison further resulting in information for said client, being then printed on a printing paper which is provided to said client.

3. An after-hour depository as defined in claim 1, wherein said locking and unlocking apparatus further includes an electromagnetic solenoid mounted on a frame, to be actuated in response to a signal transmitted from said control circuit, said locking and unlocking apparatus having an engagement section disposed on the throw-in door and an actuating mechanism operatively connected to said electromagnetic solenoid so as to enable a means for locking to engage and disengage from said engagement section.

4. An after-hour depository as defined in claim 3, wherein said engagement section further includes a locking hole formed on a side plate of said throw-in door and said locking means has a locking rod to come in and out of said locking hole in response to actuation of said electromagnetic solenoid, said locking rod being actuated by said solenoid by way of a linkage mechanism.

5. An after-hour depository as defined in claim 4, wherein said linkage mechanism includes a spring which urges said locking rod to come out of said locking hole.

6. An after-hour depository as defined in claim 1, wherein said throw-in door is actuated by a key when said electric power supply is interrupted.

* * * * *